United States Patent [19]

Lukawsky

[11] 4,062,246

[45] Dec. 13, 1977

[54] MECHANICAL MOVEMENT

[76] Inventor: Michael Lukawsky, 871 N. 22nd St., Philadelphia, Pa. 19130

[21] Appl. No.: 762,701

[22] Filed: Jan. 26, 1977

[51] Int. Cl.² ............................................ F16H 27/02
[52] U.S. Cl. ....................................................... 74/88
[58] Field of Search ................... 74/89, 88, 89.14, 425

[56] References Cited

U.S. PATENT DOCUMENTS

| 507,993 | 11/1893 | Burnham | 74/89.14 |
| 793,047 | 6/1905 | Brown | 74/89 |
| 1,156,233 | 10/1915 | Johnnsson et al. | 74/425 |
| 2,335,688 | 8/1944 | Weingart | 74/89 |
| 2,413,203 | 12/1946 | Weingart | 74/89 |
| 3,012,448 | 12/1961 | Abraham | 74/89.14 |

Primary Examiner—Benjamin W. Wyche
Assistant Examiner—Wesley S. Ratliff, Jr.
Attorney, Agent, or Firm—Beveridge, DeGrandi, Kline & Lunsford

[57] ABSTRACT

A mechanical movement includes an input member movable in opposite directions, levers each connected to and pivotally movable by the input member, crank arms connected to and movable by the levers, eccentric crank pins driven by the crank arms, and circular gears connected to and rotated by the crank pins. The gears rotate an output shaft by engaging teeth on opposite sides thereof.

6 Claims, 3 Drawing Figures

MECHANICAL MOVEMENT

BACKGROUND AND SUMMARY OF THE INVENTION

There have previously been proposed a large number of mechanical movements for changing motion from one form to another form. Typical prior patents on this subject matter are U.S. Pat. Nos. 1,097,659 and 1,553,239; and, Italian Pat. No. 358,688. These exemplify various lever-operated mechanisms for producing rotational movement, but none utilize a series of elements arranged as disclosed in this specification, which is believed by the inventor to provide for an effective utilization of the forces applied thereto.

BRIEF DESCRIPTION OF A PREFERRED EMBODIMENT

Figure 1:
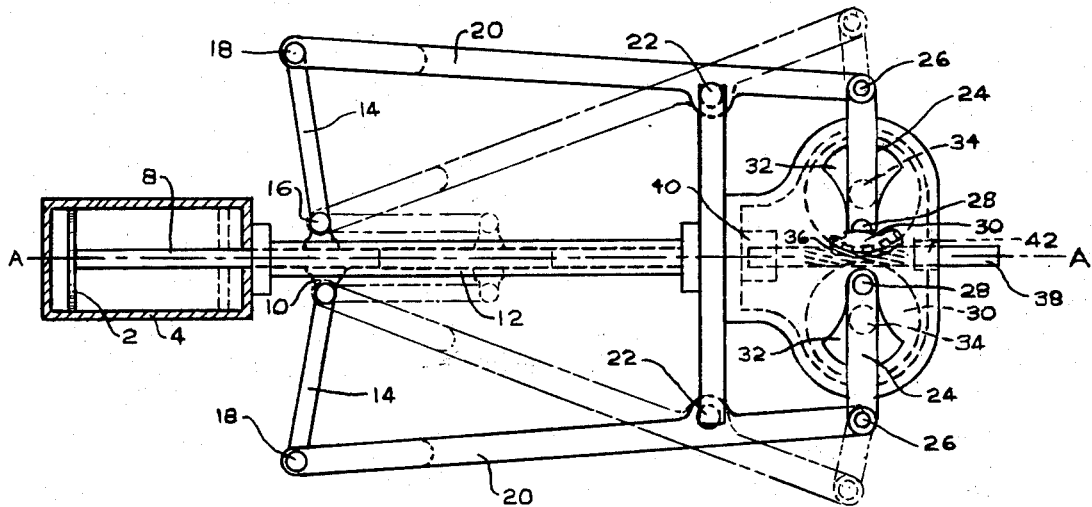
FIG. 1 is a plan view of a mechanical movement constructed according to one embodiment of the invention, wherein the input means is a cylinder-piston assembly driven by steam, hydraulic fluid or other motive fluids.

In FIG. 1, it will be seen that the mechanical movement has an input member in the form of a piston 2 located in cylinder 4 and movable in opposite directions along the axis A—A. Steam, hydraulic fluid or other motive fluids are introduced alternately into opposite ends of the cylinder 4 in order to reciprocate the piston 2 in a manner well-known in the art.

The piston rod 8 is connected to a yoke 10 which slides back-and-forth in opposite directions on a guide rail 12 coincident with the axis A—A. Ears on the yoke 10 are pivotally connected to links 14 by pivot pins 16. The other ends of the links 14 are pivotally connected at 18 to the levers 20.

The levers 20 are pivoted about their respective fulcrums 22 which enable them to rock back-and-forth between the solid line position and the broken line position as illustrated in FIG. 1. When the piston rod 8 is at its maximum extension, the links 14 lie substantially parallel to the guide rail 12 and the left ends of the levers 20 are drawn inwardly toward the axis A—A. Retraction of the piston 2 and rod 8 moves the yoke to the left, returning the levers 20 to the position shown in solid lines.

Connecting rods 24 are pivotally connected to the levers at 26. The fulcrums 22 are closer to points 26 than to points 18, whereby the levers provide a mechanical advantage from points 18 to points 26.

The inner end of each connecting rod 24 is pivotally connected to a crank pin 28 on a circular gear 30 which also carries a compensating weight 32. Appropriate bearing means enable rotary movement of gears 30 about their shafts 34, it being noted that the shafts 34 and the pivot axes 18 and 26 are mutually parallel and are perpendicular to and spaced from the axis A—A.

The teeth of the periphery of gears 30 engage the worm teeth 36 on output shaft 38, so that rotation of gears 30 causes rotation of output shaft 38 about the axis A—A. Bearings 40 and 42 support the shaft 38 for such movement.

The operation of the apparatus shown in FIG. 1 will be evident from the foregoing description. Movement of the piston 2 causes reciprocatory movement of the yoke 10 so that the links 14 produce simultaneous swinging movement of levers 20 about their respective fulcrums. The levers, acting through connecting rods 24 and crank pins 28, rotate the gears 30, each of these gears 30 rotating in an opposite direction from its counterpart. This rotation causes the teeth on gears 30 to engage the teeth 36 on shaft 38, thereby rotating the shaft 38 about the axis A—A.

Figure 2:
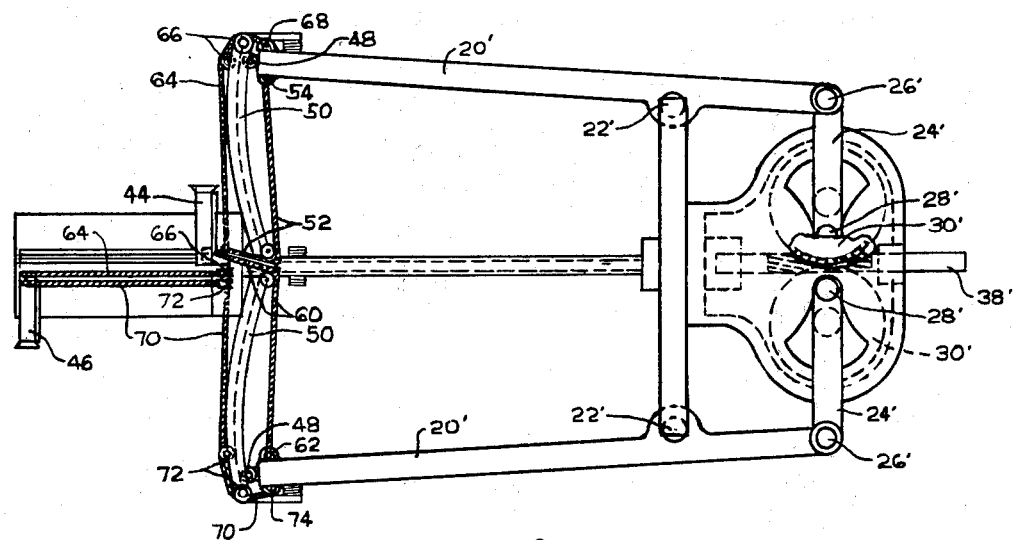
FIG. 2 is a plan view of a second embodiment of the invention which utilizes manual input forces exerted on a pedal-like elements.

The embodiment of FIG. 2 is similar to FIG. 1 in many respects, so that primed reference numerals have been used to denote those elements which are constructed and operate in the same manner as corresponding elements described in FIG. 1.

In FIG. 2, the force input is manual, being delivered by the two input members 44 and 46 which may be used as handles or pedals. The leftmost ends of levers 20' carry guide rollers 48 which are received in arcuate guide tracks formed in the rails 50.

The input members 44 and 46 are connected by ropes, cables, chains or other flexible means to the levers 20'. The input member 44 is connected by a cable 52 to an eye 54 on the inside of one of the levers 20', the cable passing over a pulley 56.

The input member 44 is also connected to a second cable 60 which passes over a stationary pulley 58 and is connected to an eye 62 on the interior side of the other lever 20'. Thus, it will be observed that leftward movement of the input member 44 draws the eyes 54 and 62 toward the given axis B—B of the FIG. 2 apparatus, swinging the levers 20' in opposite directions.

A second input member 46 is attached to a flexible cable 64 which passes over a series of pulleys 66 to engage an eye 68 on the outer side of one of the levers 20'. Member 46 also is connected to a cable 70 which passes over pulleys 72 and connects to an eye 74 on the outer side of the opposing lever 20'.

It will be observed that movement of the input member 44 to the left will act through the respective cables to swing the levers 20' inwardly, while leftward movement of the input member 46 will have the opposite effect, acting through cables 64 and 70 to swing the levers 20' outwardly to the position shown in solid lines in FIG. 2. An operator, by properly timing the delivery of forces to the input members 44 and 46 will cause the moving levers 20' to rotate the shaft 38', substantially in the same manner that the levers 20 in FIG. 1 rotate shaft 38.

Figure 3:
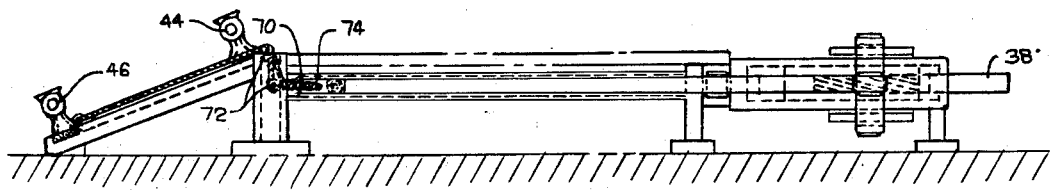
FIG. 3 is an elevational view of the apparatus shown in FIG. 2.

Although the invention may be put to many uses, one possible application thereof would be to provide a self-propelled vehicle wherein the occupant is seated on the board, facing toward the left as seen in FIGS. 2 and 3. In such a case, the output shaft 38' would be connected to a differential in a conventional drive train, and the operator would move the members 44 and 46 as pedals, leaving his hands free for steering the vehicle.

Persons familiar with the mechanical arts will recognize that the invention is suitable for many purposes, and is susceptible to many modifications which differ in form but not in substance from the disclosed embodiments. It is therefore emphasized that the invention is not limited only to the disclosed embodiments, but is encompassing of modifications thereto and variations thereof which fall within the spirit of the claims which follow.

I claim:

1. A mechanical movement, comprising
  an input member movable in opposite directions along a given axis,
  a lever pivotally movable about a fulcrum which is perpendicular to and spaced from said given axis,
  means connecting said input member to a first point on said lever spaced a given distance from said fulcrum, to move said lever about said fulcrum and to move said first point relative to said given axis in response to movement of said input member,
  a circular gear having peripheral teeth,
  means mounting said gear for rotary movement about a gear axis which is substantially parallel to the axis of said fulcrum and is spaced from both the fulcrum and the given axis,
  a crank pin on said gear spaced from the gear axis,
  a connecting rod having one end pivotally engaging said crank pin,
  means pivotally connecting said connecting rod to a second point on said lever, the distance between the first point and the fulcrum being greater than the distance between the second point and the fulcrum,
  an output shaft lying parallel to said given axis and provided with external gear teeth which are in engagement with said teeth on said circular gear, whereby movement of said input member produces movement of said lever about said fulcrum to rotate said circular gear and rotate the output shaft.

2. The mechanical movement of claim 1 wherein said given axis is closer to said gear axis than to said fulcrum.

3. The mechanical movement of claim 1 having a second set of elements which includes a second lever, a second means connecting said input means to a first point on said second lever, a second connecting rod and a second circular gear, said second set of elements being arranged and constructed as specified in claim 1 and being on an opposite side of said given axis from the elements of claim 1.

4. The mechanical movement of claim 1 wherein the means connecting the input member to the lever is a flexible member.

5. The mechanical movement of claim 4 having a second input member, and a second flexible member connecting the second input member to the lever, said flexible members being connected to opposite sides of said lever to move the lever in opposite directions in response to movement of their associated said input members.

6. The mechanical movement of claim 5 having
  means supporting the second input member for movement in opposite directions along said given axis,
  a second lever,
  means supporting said second lever for pivotal movement about a second fulcrum which is perpendicular to and spaced from said given axis,
  a third flexible member connecting said second input member to a first point on said second lever spaced a given distance from said second fulcrum, to move said second lever about said second fulcrum and to change the distance between said first point on said second lever and said given axis in response to movement of said second input member,
  a fourth flexible member connecting the input member of claim 1 to the lever, said third and fourth flexible members being connected to opposite sides of said second lever to move the second lever in opposite directions in response to movement of said input members,
  a second circular gear having peripheral teeth,
  means mounting said second gear for rotary movement about a second gear axis which is substantially parallel to the axis of said second fulcrum and is spaced from the given axis,
  a second crank pin on said gear spaced from the second gear axis,
  a second connecting rod having one end pivotally engaging said second crank pin,
  means pivotally connecting said second connecting rod to a second point on said second lever, the distance between the first point on said second lever and the second fulcrum being greater than the distance between the second point on said second lever and the second fulcrum,
  said external gear teeth on said output shaft being in engagement with said teeth on said second circular gear.

* * * * *